United States Patent
Choi et al.

(10) Patent No.: US 7,356,493 B2
(45) Date of Patent: Apr. 8, 2008

(54) APPARATUS AND METHOD FOR PASSING INFORMATION BETWEEN CATALOGS IN A COMPUTER OPERATING SYSTEM

(75) Inventors: Patricia Driscoll Choi, Apex, NC (US); Mark Edward Thomen, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/212,209

(22) Filed: Aug. 26, 2005

(65) Prior Publication Data

US 2007/0050269 A1    Mar. 1, 2007

(51) Int. Cl.
  *G06F 17/30* (2006.01)
(52) U.S. Cl. ............................................ 705/27; 707/1
(58) Field of Classification Search .................. 705/27; 707/1
  See application file for complete search history.

(56) References Cited

U.S. PATENT DOCUMENTS

| | | | | |
|---|---|---|---|---|
| 4,408,273 A * | 10/1983 | Plow | ........................ | 707/202 |
| 6,675,257 B1 * | 1/2004 | Khalid et al. | ............... | 711/111 |
| 7,139,769 B2 * | 11/2006 | Ouchi | ........................ | 705/28 |
| 2002/0023070 A1 * | 2/2002 | Branch et al. | ................. | 707/1 |
| 2002/0082953 A1 * | 6/2002 | Batham et al. | ............... | 705/27 |
| 2003/0158849 A1 * | 8/2003 | Shyam et al. | ............... | 707/100 |
| 2004/0015416 A1 * | 1/2004 | Foster et al. | .................. | 705/27 |
| 2005/0033683 A1 * | 2/2005 | Sacco et al. | .................. | 705/27 |
| 2005/0108485 A1 * | 5/2005 | Perego | ........................ | 711/162 |
| 2005/0187990 A1 * | 8/2005 | Pace et al. | ................... | 707/204 |
| 2005/0283564 A1 * | 12/2005 | LeCrone et al. | ............ | 711/100 |

OTHER PUBLICATIONS

"MDL and Lancaster Exchange Catalog Data; Agreeement Ensures Timely, Accurate Content in Chemical Sourcing Catalogs," Business Wire, Aug. 5, 2002, 3 pgs.*

* cited by examiner

*Primary Examiner*—Jeffrey A. Smith
*Assistant Examiner*—Jason B. Dunham
(74) *Attorney, Agent, or Firm*—Kunzler & McKenzie

(57) ABSTRACT

An apparatus and method are disclosed for passing data between catalogs in a computer operating system. The apparatus includes an identifying module, a receiving module, a definition module, and an updating module. The identifying module identifies a first catalog having at least one data set to be passed to a second catalog. The receiving module receives the information from the first catalog. The information includes the location of data-specific information. The definition module utilizes the information received from the first catalog to define the second catalog. The updating module utilizes the location of the data-specific information received from the first catalog to update the information to reflect the name of the second catalog.

8 Claims, 4 Drawing Sheets

APPARATUS AND METHOD FOR PASSING INFORMATION BETWEEN CATALOGS IN A COMPUTER OPERATING SYSTEM

BACKGROUND OF THE INVENTION

1. Field of the Invention

This invention relates generally to passing information between catalogs in a computer operating system and more particularly relates to an apparatus and method for moving information associated with data sets between catalogs in a computer operating system without having to search memory storage or external storage for the location of data-specific information.

2. Description of the Related Art

The majority of businesses in the world today use computers and computer operating systems to store and manage information. The information stored in computer operating systems is typically organized into catalogs. Users may want to pass information from one catalog to another for several reasons. For example, the user might want to assign each division within a company its own catalog. Thus, the company would need to pass information associated with the division that is stored in the company catalog into a corresponding division catalog. Many users also set up their catalogs for specific recoverability in the event that information becomes lost or corrupted. Uncorrupted data would need to be transferred into the reformatted catalog to replace the corrupted data. It is important to many users that information can be passed or moved between catalogs quickly and easily.

Catalogs are utilized to organize and locate data sets. A catalog in essence is a data set that contains information required to locate other data sets. A data set is often the fundamental unit of data storage and retrieval and typically consists of a collection of data in one of several prescribed arrangements. These arrangements are described by control information to which the computer operating system has access. A data set is a collection of logically related data records stored on one external storage volume or a set of volumes. A data set can be, for example, a source program, a library of macros, or a file of data records used by a processing program. A catalog does not have to be on the same volumes as the data sets the catalog describes. A catalog can refer to hundreds or thousands of data sets spread across many volumes.

Catalogs are sometimes structured in an integrated catalog facility (ICF). An ICF catalog may include two components. One component contains non-data-specific information, or the logical description, of a data set. The other component contains data-specific information, or the physical description, of a data set. Catalogs allow users to find and access a data set by name without knowing the exact location of the data set in memory storage. By cataloging data sets, users do not need to know about the storage setup.

FIG. 1 illustrates a schematic block diagram of a typical prior art apparatus 100 to pass or move information between catalogs in a computer system. A catalog interface 101 may include a utility component 102 and a catalog component 106.

The catalog interface 101 may be contained within a computer operating system 104 and may interface with memory containing one or more the volumes 114, 116. The memory 112 may be in the form of external storage 112. There is may be one or more processors 110 driving the computer operating system 104 and executing the catalog interface 101.

The volumes 114, 116 can include an ICF catalog 118, a volume table of contents (VTOC) 120, and a plurality of data sets 122. The ICF catalog, as mentioned above, contains non-data-specific information ("NDS Info") 124 and data-specific information ("DS Info") 126. The VTOC 120 may list the data sets that reside on its volume, along with information about the location and size of each data set, and other data set attributes.

The search module 108 in the prior art catalog interface 101 searches the volumes 114, 116 in external storage to find the data-specific information associated with the data set to be passed or moved between catalogs so that the information can be updated.

Referring now to FIG. 2, the catalog interface 101 may execute steps 200 to pass or move information between catalogs. The catalog interface 101 identifies 204 a data set in a first catalog to be passed to a second catalog. The catalog interface 101 receives 206 information attributes from the first catalog and uses those attributes to define 208 non-data-specific information into a second catalog.

One problem with prior art apparatuses and methods, however, is that there is no pointer available to point to the remainder of the information that needs to be passed. Thus, the prior art requires that at the time the non-data-specific information is defined into the second catalog, a sequential search 210 of the data-specific information on the volumes in the external storage 112 must be performed to locate any data-specific-information associated with the data set being passed. Then, the associated data-specific information, found by the search, is updated to reflect the name of the second catalog instead of the name of the first catalog. When a substantial volume of information is being passed between catalogs, the time taken for the sequential search can be very significant.

Another problem with prior art apparatuses and methods is that the search required to locate the data-specific information is serialized against other systems. This potentially prevents updates to the data-specific information associated with other data sets on the volumes being searched.

Twenty-five years ago, the volume of information stored in catalogs was small and manageable. However, the volume of information needed to be stored in today's society is growing larger and larger. Prior art apparatuses and methods do not efficiently handle data transfer in today's world. Prior art processes that pass information between catalogs are slowed down immensely by the amount of data transferred today. Customers desire systems with improved performance.

From the foregoing discussion, it should be apparent that a need exists for an apparatus and method that improves the performance in the process of passing information between catalogs in a computer operating system. It would be an advancement in the art to provide such an apparatus and method that would require fewer resources to complete a transfer of information. It would be a further advancement in the art to provide such an apparatus and method that could pass information between catalogs in a more timely fashion, as time is an increasingly more expensive commodity in today's high-paced world. Such an apparatus and method is disclosed and claimed herein.

SUMMARY OF THE INVENTION

The present invention has been developed in response to the present state of the art, and in particular, in response to the problems and needs in the art that have not yet been fully solved by currently available methods of passing information between catalogs in a computer operating system. Accordingly, the present invention has been developed to provide an apparatus and method for passing information between catalogs in a computer operating system that overcome many or all of the above-discussed shortcomings in the art.

The apparatus for passing information between catalogs in a computer operating system is provided with a logic unit containing a plurality of modules configured to functionally execute the necessary steps of identifying a first catalog, receiving the information associated with at least one data set to be passed, defining a second catalog utilizing the information received and updating the records to be associated with the second catalog. These modules in the described embodiments include an identification module, a receiving module, a defining module and an updating module. The apparatus may further include a deletion module to delete non-data-specific information associated with the data set to be passed.

In one embodiment, the information received by the receiving module includes the location of non-data-specific information associated with the data set being passed to the second catalog. Non-data-specific information associated with a data set may be contained within a basic catalog structure (BCS). The physical description, or data-specific information associated with the data set to be passed may be contained within a VSAM volume data set (VVDS).

A method of the present invention is also presented for passing information between catalogs in a computer operating system. The method in the disclosed embodiments substantially includes the steps necessary to carry out the functions presented above with respect to the operation of the described apparatus. The method may include identifying a first catalog comprising at least one data set to be passed to a second catalog and receiving non-data-specific information associated with the first catalog. In one embodiment, the non-data-specific information includes a location of data-specific information associated with at least one data set. The method may also include defining the second catalog utilizing the non-data-specific information received from the first catalog and updating the second catalog utilizing the location of the data-specific information received from the first catalog. The method also may include deleting a catalog entry from the first catalog upon receiving the information from the catalog entry. The method may be carried out as operations on a signal-bearing medium.

A method of the present invention is also presented for passing information between catalogs for a customer. The method may comprise receiving a name of at least one catalog containing information to be passed to a second catalog. The method may also include building a catalog interface. The method may also comprise installing a catalog interface and providing the catalog interface to a customer.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
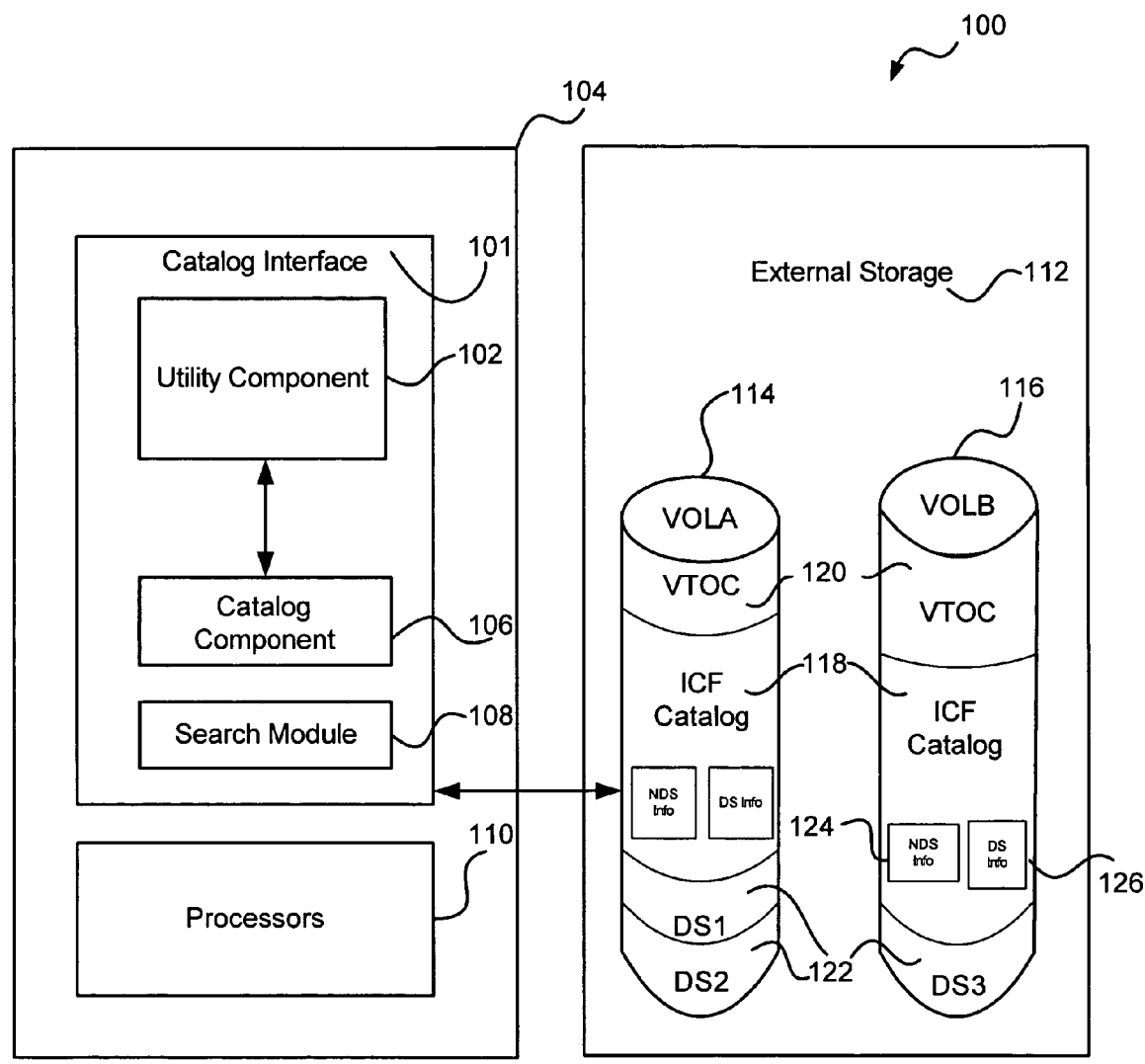
FIG. 1 is a schematic block diagram illustrating a typical prior art apparatus to pass information between catalogs in a computer operating system.
Figure 2:
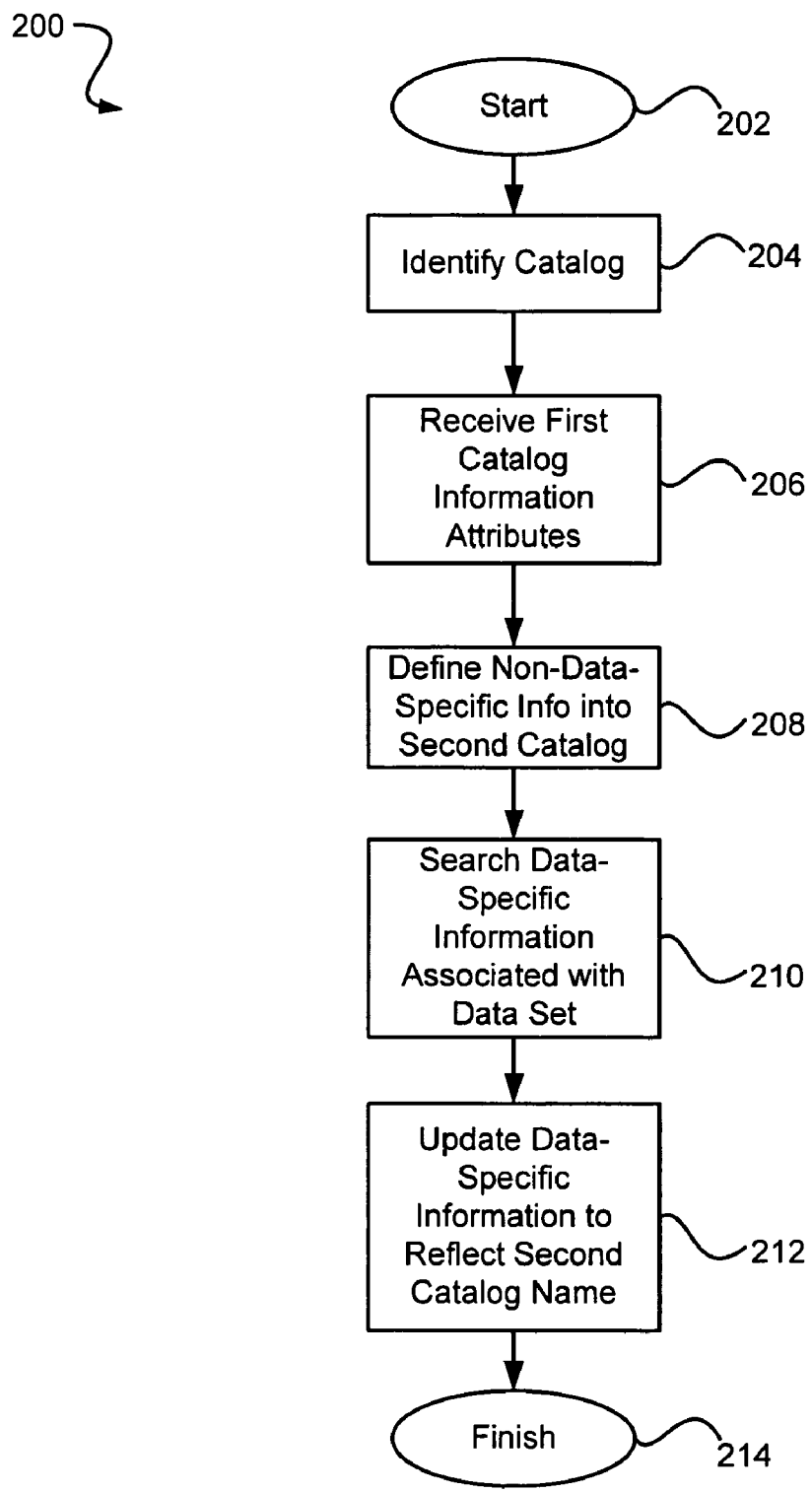
FIG. 2 is a schematic flow chart diagram illustrating a typical prior art method of passing information between catalogs in a computer operating system.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal-bearing medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 3:
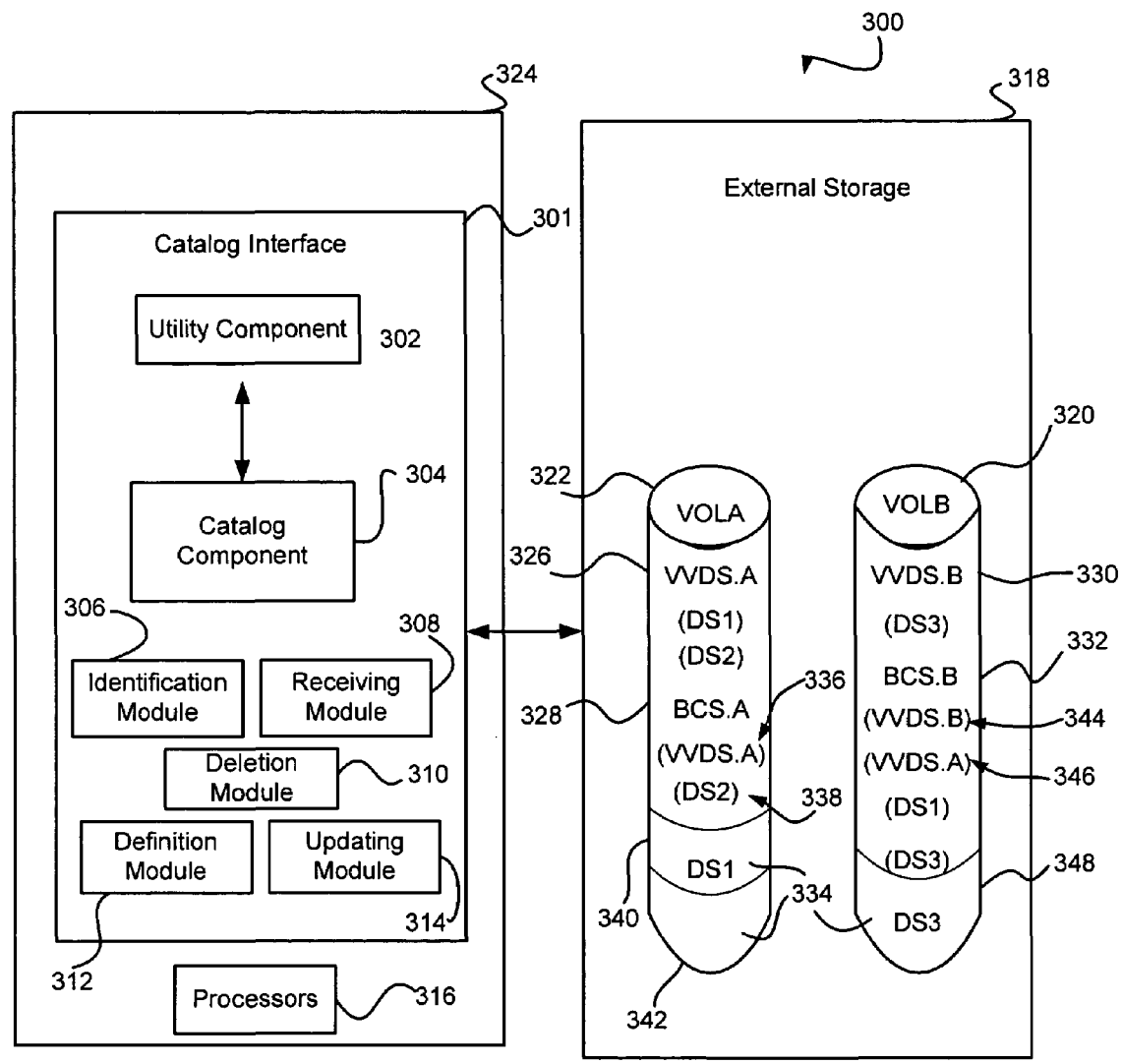
FIG. 3 is a schematic block diagram illustrating one embodiment of an apparatus to pass information between catalogs in a computer operating system in accordance with the present invention.

FIG. 3 depicts a schematic block diagram illustrating one embodiment of an apparatus 300 to pass or move information between catalogs in a computer operating system in accordance with the present invention. In one embodiment, passing information may be transferring information from a first catalog to a second catalog so that the information is no longer in the first catalog. It will be appreciated by those of skill in the art that the blocks in FIG. 3 are for illustration only. The catalogs may or may not be on the same volumes as the data sets each catalog describes.

The apparatus includes a catalog interface 301 comprising a utility component 302 and a catalog component 304. The utility component 302 communicates with a catalog component 304 in order to specify what information a user desires to be passed between catalogs in a computer operating system 324. It will be appreciated by those of skill in the art that passing information includes, without limitation, copying information, moving information, and the like.

In one embodiment, a user interfaces with the utility component 302 and executes commands in real time. One of those commands may allow users to copy individual, groups, or an entire catalog contents to another catalog. In another embodiment, a user may run a batch job that executes without direct user intervention. A batch job invokes the utility component 302 and provides control statements to the utility component 302 that describe what a user wants to be done. The utility component 302 communicates with the catalog component 304. The catalog component 304 makes the actual updates to the catalog, and returns the information requested by the utility component 302.

In one embodiment, the catalog interface 301 may be executed utilizing a processor running a computer operating system. In another embodiment, the computer operating system 324 may comprise multiple processors 316 executing the catalog interface 301. In one embodiment, the computer operating system 324 may also a mainframe computer operating system. The catalogs reside on volumes in memory that may include external storage 318 such as external disk devices. In one embodiment, the external storage 318 may be a direct access storage device (DASD). The memory 318 is directly accessible to the computer operating system 324 that is performing the passing of information between catalogs.

The catalog interface 301 includes a plurality of modules to perform the operations required to pass information between catalogs. These modules may include an identification module 306, a receiving module 308, a deletion module 310, a definition module 312, and an updating module 314.

The identification module 306 is configured to identify a first catalog comprising at least one data set to be passed to a second catalog. Identification may be accomplished using information communicated by a utility component 302. In one embodiment, the catalog includes non-data-specific and data-specific information about each data set residing in the catalog. For example, the catalog may be an integrated catalog facility (ICF) catalog that includes a basic catalog structure (BCS) and a virtual storage access method (VSAM) volume data set (VVDS). In one embodiment, the BCS may include non-data-specific information about a data set and the VVDS may include data-specific information about the data set. The ICF catalog may include one BCS and one or more VVDSs. It will be appreciated by those of skill in the art that any volume containing a BCS also contains a VVDS, because the BCS is itself a VSAM data set.

In one embodiment, the BCS may be a VSAM key-sequenced data set that uses the data set name of entries to store and retrieve non-data-specific, or basic entry information associated with the data set. An entry may be a collection of information about a cataloged object. A catalog entry describes the data component of a catalog. In one embodiment, the catalog entry is a BCS entry.

Non-data specific information may include without limitation, volume serial numbers on which the data set resides, the expiration date of the data set, information about who created the data set, information about what types of volumes the data set is on, the locations in the VVDSs of the associated records for the data set, and the like.

The VVDS may be a VSAM entry-sequenced data set. A VVDS resides on each volume that contains a VSAM or a storage management subsystem (SMS) managed data set cataloged in an ICF catalog. The VVDS is on the same volume as the data sets it describes. In one embodiment, an entry is a VVDS entry. VVDS entries contain data-specific information associated with the data set that is to be passed between catalogs. Data-specific information may include, without limitation, data set characteristics, extent information, volume-related information of the data sets cataloged in the BCS, and the like.

The second catalog may be an existing catalog or a catalog created by a user. It may be an empty catalog or a partially filled catalog. The second catalog may be specified based on information communicated via the catalog interface 301. The second catalog may also be an ICF catalog comprising BCS and VVDS entries.

The catalog interface 301 also includes a receiving module 308 configured to receive information associated with the first catalog. In one embodiment, the information is non-data-specific information. In another embodiment, the information may include basic entry or BCS information. The information may include a location of data-specific information associated with at least one data set. The information may be contained in data records on volumes in external storage 318. A data record refers to a set of data treated as a single unit. In one embodiment, the data records are VSAM volume data records (VVRs).

The receiving module 308 may create an attribute list out of the information received from the first catalog and pass it to the definition module 312. The receiving module 308 may also receive a location of each of the VVDS records associated with the first catalog.

The definition module 312 is configured to define the second catalog utilizing the information associated with the first catalog. In one embodiment, the definition modules defines the information into the second catalog. In one embodiment, the definition module 312 utilizes non-data-specific information. The non-data-specific information may include information contained in a BCS entry. The information may include the location of the VVDS entries associated with the data set being passed. The definition module may call the second catalog and utilize the attribute list to define a new catalog entry in the second catalog. In one embodiment, the new catalog entry may be a recreation of the BCS entry of the first catalog.

Because the second catalog receives the location of the data-specific information of the data set being passed to the second catalog, the definition module 312 recognizes that a search of at least one VVDS is no longer required to locate the VVDS entries associated with the data set. Thus, the invention teaches a more efficient way to pass information between catalogs.

The updating module 314 is configured to update the second catalog, or the records to be associated with the second catalog utilizing the location of the data-specific information of at least one data set received from the first catalog. In one embodiment, the data-specific information is contained in a VVDS. The updating module is further configured to update the data-specific information for each data set corresponding to the first catalog that subsequently corresponds to the second catalog after the transfer. The updating module 314 may also update any pointers associated with transferred data sets or with the location of any information affected by the transfer. Accordingly, the present invention does not need to search for the location of data-specific information, thus saving time and making data transfer more efficient.

The location of data-specific information may be a relative byte address (RBA). The relative byte address is the displacement of data-specific information from the beginning of the data set to which it belongs. In one embodiment, the updating module 314 uses the RBA of each VVDS record previously associated with the first catalog to directly access the VVDS records and update them to reflect the name of the second catalog. Thus, the information will be associated with the second catalog as opposed to the first catalog.

The deletion module 310 is configured to delete the non-data-specific information corresponding to the data set being passed from the first catalog upon receiving the information from that entry. In one embodiment, the deletion module 310 deletes the BCS entry or catalog entry. The data set itself still exists and the VVDS entries on the same volume on which the data set exists still exist. In one embodiment, only the BCS entry corresponding to the data set is removed.

As discussed above, the catalog interface 301 interfaces with the memory storage 318. The external storage 318 may include a plurality of volumes 320, 322 of information. These volumes 320, 322 may include tape volumes or direct access storage device (DASD) volumes. It will be appreciated by those of skill in the art that other types of external storage may be used to practice the teachings of the invention.

Each volume may contain a BCS 328, 332, a VVDS 326, 330 and a plurality of data sets 334. A catalog may include more than one VVDS 326, 330 on different volumes. For example, the external storage 318 may include two DASD volumes 320, 322. Each BCS 328, 332 may have entries for VVDSs 326, 330 or data sets 334. The BCS 328 on Volume A 322 includes one VVDS entry 336 associated with it and also includes an entry 338 for one of the data sets that resides on its volume 322. The VVDS 326 includes information about the data sets 334 that reside on the same volume 322, namely DS1 340 and DS2 342. The BCS 332 on Volume B 320 includes two VVDS entries 344, 346 associated with it and also includes entries 348, 350 for one data set 348 on its volume 320 and one data set on Volume A 322. The VVDS 330 includes information about the data set 348 that resides on Volume B 320, namely DS3 348.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 4:
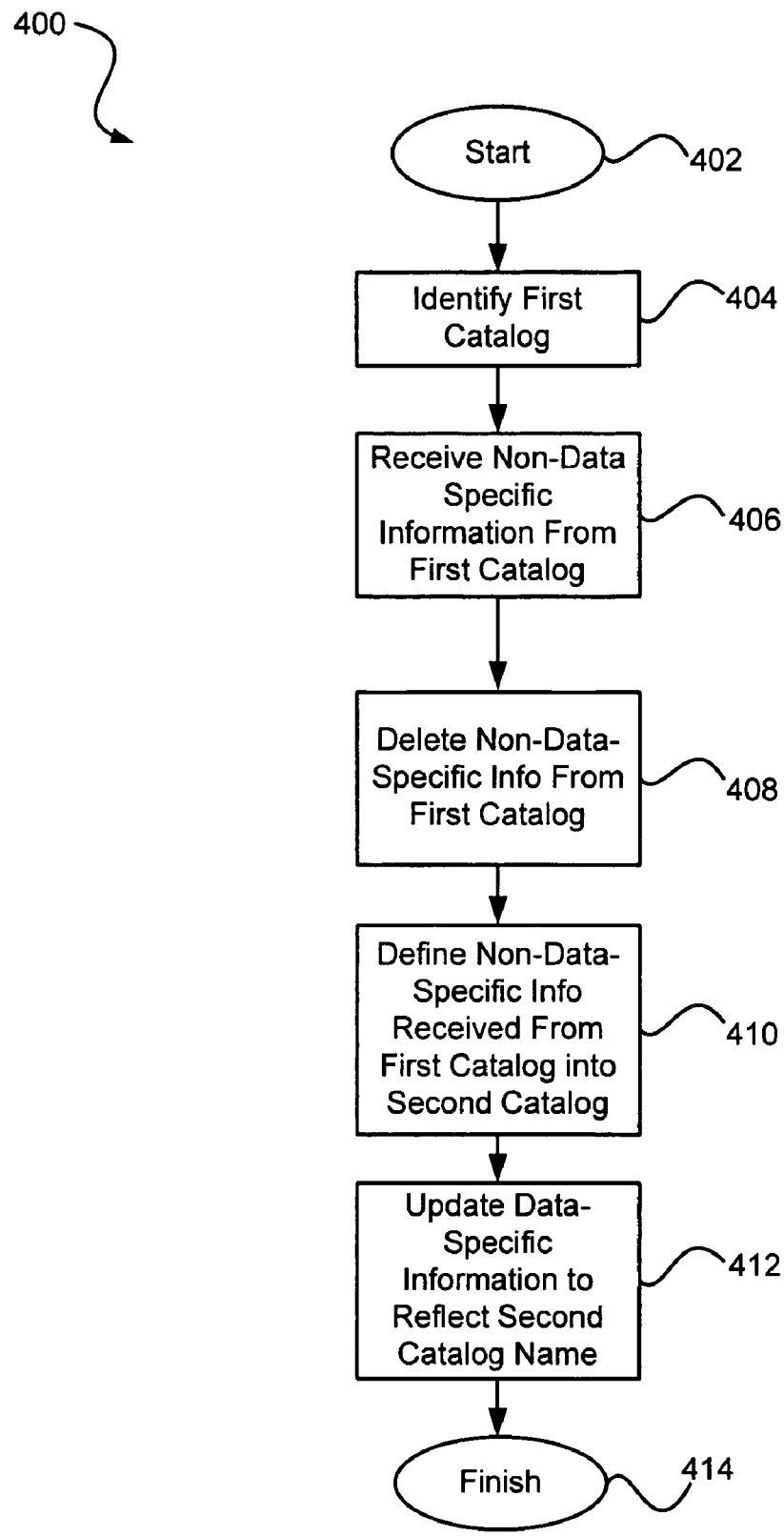
FIG. 4 is a schematic flow chart diagram illustrating one embodiment of a method to pass information between catalogs in accordance with the present invention.

FIG. 4 is a schematic flow chart diagram illustrating one embodiment of a method 400 to pass information between catalogs in accordance with the present invention. The method 400 starts 402 and identifies 404 a first catalog comprising at least one data set to be passed to a second catalog. The catalog interface 301 receives 406 non-data-specific information, or attributes, associated with the data set from the first catalog. In one embodiment, the catalog interface 301 receives 406 information including the location of data-specific information associated with the data set to be passed. The non-data-specific information associated with the data set being passed from the first catalog is deleted 408 upon the receiving module 308 receiving the non-data-specific information.

A second catalog may be defined 410 by creating a catalog entry utilizing the attributes or non-data-specific information received from the first catalog. The definition module defines the data associated with the first catalog into the second catalog. The receiving of the location of the nondata-specific information removes the necessity of sequentially searching for the remainder of the data-specific information, thus making the process more efficient.

The catalog interface 301 then updates 412 the data-specific information associated with the first catalog to reflect the second catalog name. The updating module 314 utilizes the location of the data-specific information received to update the data-specific information. In one embodiment, the data-specific information is the physical description of a data set contained in a VVDS entry. The location may be the relative-byte address (RBA) of a VVDS record. The updating module 314 directly accesses the VVDS record using the relative-byte address received from the first catalog, reads the record, updates the catalog name, and rewrites the record. In one embodiment, the catalog name is the BCS name.

In one embodiment, a data set and/or the catalogs may reside on multiple volumes. In this embodiment, the non-data-specific information would include a plurality of RBAs for the VVDS records on each of the volumes associated with the data set. The updating module 314, in this embodiment, would directly access the VVDS records on each of the volumes and update the records to reflect the second catalog name. The above-described method may be accomplished in the form of operations by a signal-bearing medium tangibly embodying a program of machine-readable instructions executable by a digital processing apparatus. In one embodiment, a computer program product includes or tangibly embodies a computer readable medium having computer usable program code for facilitating the access of system information. The computer program product includes computer usable program code to implement the method described above. The method and corresponding program code may also include the steps necessary to carry out the function of the modules described above.

The present invention also teaches a method to pass information between catalogs for a customer. The method comprises receiving the name of at least one catalog containing information to be passed to a second catalog. The method also comprises building a catalog interface. In one embodiment, the catalog interface may comprise a utility component, or program, and a catalog component. In another embodiment, it may comprise one of the components, but not the other. The utility component may be any number of utility programs known in the art. For example, the utility program may be IDCAMS created by IBM. IDCAMS is an IBM utility program that allows you to create and manipulate VSAM data sets.

The catalog interface provided to the customer may perform an operation to identify a first catalog having at least one data set to be passed to a second catalog. The interface may also include an operation to receive non-data-specific information associated with the at least one data set to be passed to the second catalog. The information may include a location of data-specific information associated with the at least one data set. The interface also includes an operation to define the second catalog utilizing the non-data-specific information associated with the at least one data set of the first catalog. An operation to update the second catalog utilizing the location of the data-specific information associated with the at least one data set received form the first catalog may also be included in the interface.

The method also includes installing the catalog interface and providing the catalog interface to the customer. Providing may be, but is not limited to, providing the interface to a customer through remote access, or providing the customer with an option to install the catalog interface on their own computer.

The updating operation of the catalog interface provided for a customer may further include directly accessing the data-specific information associated with the at least one data set utilizing the location received, and updating the data-specific information to reflect the name of the second catalog.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed is:

1. A computer program product comprising a computer useable medium having a computer readable program, wherein the computer readable program when executed on a computer causes the computer to:

identify a first integrated catalog facility catalog comprising at least one data set to be passed to a second integrated catalog facility catalog, wherein each catalog organizes data set information for an operating system using a BCS with non-data-specific information for each data set and at least one VVDS with data-specific information for each data set, wherein the BCS is a VSAM key-sequenced data set that uses the data set name of entries to store and retrieve non-data-specific information for each data set, and the operating system accesses data sets using the catalog;

receive the non-data-specific information associated with the first catalog, the non-data-specific information including a location of data- specific information associated with the at least one data set, wherein the non-data specific information is a logical description of the at least one data set and the data-specific information is a physical description of the at least one data set;

define the second catalog utilizing the non-data-specific information associated with the at least one data set of the first catalog;

create a second catalog name for the second catalog;

create the second catalog utilizing the location of the data-specific information associated with the at least one data set received from the first catalog, wherein the second catalog is created by accessing the VVDS using a relative-byte address of each VVDS record associated with the first catalog and received from the first catalog, reading the VVDS using a pointer to remaining information, the pointer comprising the relative-byte address, and rewriting the VVDS using the second catalog name in place of the first catalog name; and delete the BCS corresponding to the at least one data set upon receiving the non-data-specific information from the first catalog.

2. The computer program product of claim 1, wherein the computer readable code is further configured to cause the computer to create an attribute list from the non-data-specific information received from the first catalog.

3. The computer program product of claim 2, wherein defining the second catalog utilizes the attribute list.

4. The computer program product of claim 1, wherein the computer readable code is further configured to cause the computer to create a new BCS entry associated with the at least one data set being passed in the second catalog.

5. The computer program product of claim 1, wherein the computer readable code is further configured to cause the computer to directly access the data-specific information and update the data- specific information to reflect the name of the second catalog.

6. A method to pass information between catalogs in a computer operating system for a customer, the method comprising:
   receiving the name of at least one first integrated catalog facility catalog containing information to be passed to a second integrated catalog facility catalog, wherein each catalog organizes data set information for an operating system using a BCS with non-data-specific information for each data set and at least one VVDS with data-specific information for each data set, wherein the BCS is a VSAM key-sequenced data set that uses the data set name of entries to store and retrieve non-data-specific information for each data set, and the operating system accesses data sets using the catalog;
   building a catalog interface between the at least one first catalog and the second catalog, the catalog interface being able to perform the operations comprising receiving the non-data-specific information associated with the at least one data set to be passed to the second catalog, the non-data-specific information including a location of data-specific information associated with the at least one data set, wherein the non-data specific information is a logical description of the at least one data set and the data-specific information is a physical description of the at least one data set;
   defining the second catalog utilizing the non-data-specific information associated with the at least one data set of the at least one first catalog;
   create a second catalog name for the second catalog;
   creating the second catalog utilizing the location of the data-specific information associated with the at least one data set received from the at least one first catalog, wherein the second catalog is created by accessing the VVDS using a relative-byte address of each VVDS record associated with the first catalog and received from the at least one first catalog, reading the VVDS using a pointer to remaining information, the pointer comprising the relative-byte address, and rewriting the VVDS using the second catalog name in place of the first catalog name;
   deleting the BCS corresponding to the at least one data set upon receiving the non-data-specific information from the first catalog;
   installing the catalog interface; and
   providing the catalog interface to the customer.

7. The computer program product of claim 1, wherein the non-data specific information comprises volume serial numbers on which the data set resides, the expiration date of the data set, information about who created the data set, information about what types of volumes the data set is on, and the locations in the VVDSs of the associated records for the data set.

8. The method of claim 6, wherein the non-data specific information comprises volume serial numbers on which the data set resides, the expiration date of the data set, information about who created the data set, information about what types of volumes the data set is on, and the locations in the VVDSs of the associated records for the data set.

* * * * *